G. UTLEY.
HAY OR COTTON PRESS.
No. 106,638. Patented Aug. 23, 1870.
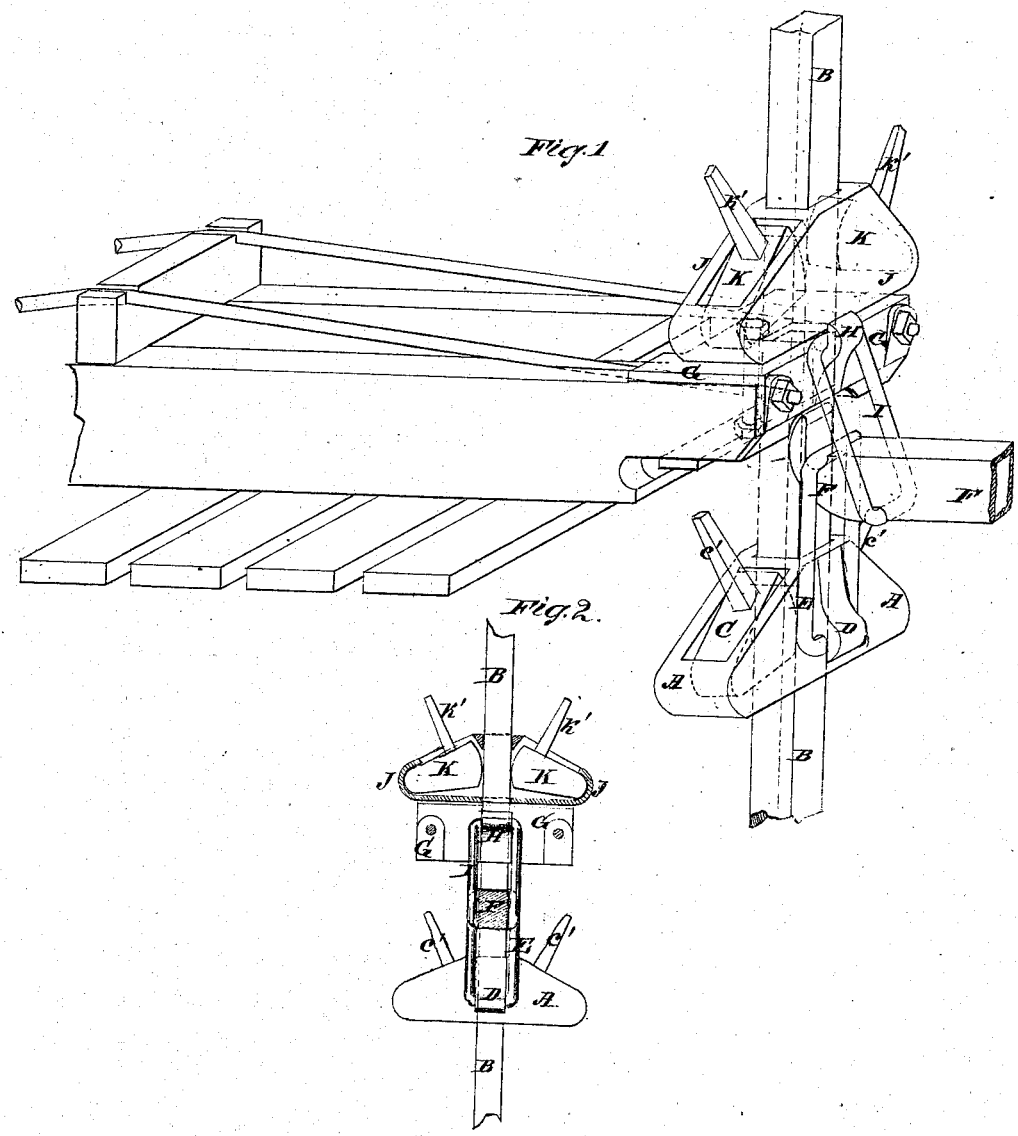

United States Patent Office.

GREY UTLEY, OF CHARLOTTE, NORTH CAROLINA.

Letters Patent No. 106,638, dated August 23, 1870.

IMPROVEMENT IN HAY AND COTTON-PRESSES.

The Schedule referred to in these Letters Patent and making part of the same

*To all whom it may concern:*

Be it known that I, GREY UTLEY, of Charlotte, in the county of Mecklenburg and State of North Carolina, have invented a new and useful Improvement in Hay and Cotton-Press; and I do hereby declare that the following is a full, clear, and exact description thereof, which will enable others skilled in the art to make and use the same, reference being had to the accompanying drawing forming part of this specification, in which—

Figure 1 is a perspective view of my improved device.

Figure 2 is a side view of the same, partly in section, to show the construction.

Similar letters of reference indicate corresponding parts.

My invention has for its object to improve the construction of my improved hay and cotton-press, patented May 12, 1868, and numbered 77,852, so as to make it more convenient and satisfactory in use, and more effective in operation; and It consists in the construction and combination of various parts of the device, as hereinafter more fully described.

A represents one of the lifting-blocks, which has a square hole formed through its center, for the passage of the square bar B, which passes up at the ends of the frame of the press, and is securely attached to said frame.

C are the dogs, which are made in about the shape shown in figs. 1 and 2, and are placed in recesses formed in the end parts of the block A, so that their outer ends may rest against the rounded rear ends of the recesses in the block A, and their rounded forward ends may rest against the opposite sides of the bar B.

The dogs C are provided with handles, c', for convenience in inserting and removing them.

By this construction, when the block A is drawn upon in working the lever, the dogs C clamp the bar B, and thus form a fulcrum for the lever. As the lever is released or raised, the block A drops down by its own weight, giving the said lever a new purchase.

Upon the outer side of the block is formed a hook or catch D, to receive the lower end of the link E, through the upper end of which is passed the end of the lever F, as shown in fig. 1.

G is an angle-plate, fitting upon and secured to the projecting ends of the timbers or bars of the follower.

Through the upper part of the angle-plate G is formed a square hole, for the passage of the bar B.

Upon the outer side of the lower part of the angle-plate G is formed a hook or catch, H, to receive the upper end of the link I, through the lower part of which the lever F passes, and the lower end of which rests in a notch in the lower side of said lever at a little distance from its end, as shown in fig. 1.

By this construction, when the outer or free end of the lever F is pressed downward the angle-plate G is drawn downward, drawing the follower down upon the material in the press, compressing it.

J is a block, placed above the square bar B just above the angle-plate G, upon which plate the said block J rests.

The recessed ends of the block J are provided with dogs, K, provided with handles, k', and operating in precisely the same manner as the dogs C of the block A.

By this construction, as the angle-plate G is drawn downward by the action of the lever F, the block J follows it, so as to rest all the time upon its upper side.

When the outer end of the lever F is raised, to take a new purchase, the dogs K of the block J clamp the bar B, and prevent the follower from being forced up by the upward pressure of the material being compressed.

By making the angle-plate G and the upper block J in two pieces, in the manner herein described, the ends of the follower may be operated upon alternately, which cannot be done when the said parts are made in one piece without causing said piece to bind upon the bar B, and breaking it.

Having thus described my invention,

I claim as new and desire to secure by Letters Patent—

The loose clamping-block J K and angle-plate G, provided with a hook or catch upon its outer side, made separate, and operating in connection with the link I, lever F, link E, clamping-block A C, and stationary bar B, substantially as herein shown and described, and for the purpose set forth.

GREY UTLEY.

Witnesses:
HUME F. HILL,
E. W. LONG.